United States Patent [19]

Neiman

[11] 4,107,960
[45] Aug. 22, 1978

[54] ANTI-THEFT PLUG FOR SCREW-THREADED BASE WITH A TIGHTENING TORQUE LIMITING DEVICE

[75] Inventor: Michel Neiman, Paris, France

[73] Assignee: Societe de Diffusion Neiman, Courbevoie, France

[21] Appl. No.: 813,852

[22] Filed: Jul. 8, 1977

[30] Foreign Application Priority Data

Jul. 26, 1976 [FR] France ............... 76 22682

[51] Int. Cl.² ........................... E05B 65/52
[52] U.S. Cl. ............................ 248/165; 220/210
[58] Field of Search ............ 70/165, 167, 168, 169, 70/170, 163, 173; 220/210, 86 AT

[56] References Cited

U.S. PATENT DOCUMENTS

| 1,624,840 | 4/1927 | Malluk ............... 70/172 X |
| 1,649,587 | 11/1927 | Halaby ............... 70/172 X |
| 1,701,816 | 2/1929 | Malluk et al. ........... 220/210 |
| 1,903,765 | 4/1933 | Johnson ............... 70/171 |
| 3,915,335 | 10/1975 | Shanklin et al. ......... 70/169 X |
| 3,945,454 | 3/1976 | Kinoshita ............. 220/210 |
| 3,998,078 | 12/1976 | Detwiler ............. 220/210 |
| 3,998,353 | 12/1976 | Farelli ............... 70/167 X |
| 4,000,632 | 1/1977 | Summan .............. 70/165 |
| 4,000,633 | 1/1977 | Evans ................ 70/165 |
| 4,028,914 | 6/1977 | Saele ................ 70/165 |

Primary Examiner—J. Franklin Foss
Attorney, Agent, or Firm—William Anthony Drucker

[57] ABSTRACT

The anti-theft plug or cap for the filler of a gasoline tank comprises a plate with a tapping corresponding to threading on the filler, a body rotatable in respect of the said plate, a securing element serving to render the said body integral with the said plate, and a cylindrical lock mounted in the said body and controlling the said securing element. The securing element rotatable with the rotatable body and serving to render the body fixed in relation to said plate, is provided with an elastically deformable arm resiliently removable from the axis of the plug under the action of the said lock, while its free end, when the arm has undergone no deformation, is disengaged from said teeth, although it engages them when the arm has undergone deformation.

5 Claims, 3 Drawing Figures

ANTI-THEFT PLUG FOR SCREW-THREADED BASE WITH A TIGHTENING TORQUE LIMITING DEVICE

BACKGROUND OF THE INVENTION

The invention relates to an anti-theft plug or cap for a screw-threaded base of the type comprising a plate with a tapping corresponding to the threading of the base, a body rotatable in respect of the said plate, a securing element serving to render the said body integral with the said plate, and a cylindrical lock mounted in the said body and controlling the said securing element.

These known plugs suffer from the drawback that when the user screws the plug onto the base he risks applying an excessive final torque which may make it difficult to unscrew the plug and which may even result in damage to the screw threads and/or the securing element.

It has therefore been proposed, in order to eliminate this risk, that the securing element should be fitted with a torque limiting device, in such a way as to separate the rotary body and the plate when the tightening torque exceeds a certain value. The various proposals made for this purpose involve a number of disadvantages. In particular, they are too complicated and expensive to carry out or else necessitate eccentric mounting of the lock, which in certain cases, leads to problems regarding the space occupied by the apparatus.

The purpose of the present invention is to eliminate the drawbacks of the known plugs, by means of a new plug which will be simple and inexpensive to manufacture and assemble and which will enable the lock to be mounted non-eccentrically.

SUMMARY OF THE INVENTION

According to the invention we provide an anti-theft plug for a screw-threaded base, comprising a plate with a thread corresponding to the threading of the base, a body rotatable in respect of the said plate, a cylindrical lock mounted in the said body, a toothed rim on said plate and a securing element being rotatable with the rotatable body and serving to render the said body integral with the said plate, having an elastically deformable arm resiliently removable from the axis of the plug under the action of the said lock, while its free end, when the arm has undergone no deformation, is disengaged from said teeth, although it engages them when the arm has undergone deformation.

BRIEF DESCRIPTION OF DRAWINGS

The invention will be clearly understood from a study of the following description by reference to the accompanying drawing, in which.

DESCRIPTION OF PREFERRED EMBODIMENT

Figure 1:
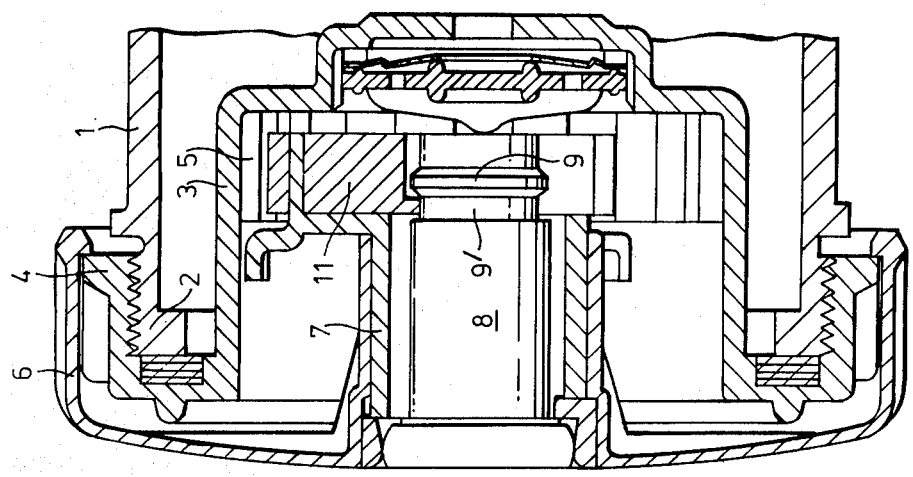
FIG. 1 is an axial section through a plug in accordance with one version of the invention, mounted on a base.

The plug according to the invention is designed to be mounted on a base 1 of a petrol tank (not shown in the drawing), the base 1 being provided at its end with a peripheral screw threading 2. The plug comprises a plate 3 provided with a thread 4 corresponding to the screw threading 2. The plate 3 also comprises an internal toothed rim 5.

The plug also includes a body 6 journalled on the plate 3 and forming a cover. The body 6 comprises a cyindrical chamber 7 containing a cylindrical lock 8 provided in the vicinity of its inner end with a collar 9 forming a groove 9'. This inner end comprises a flatted bar 10.

The plug also includes a securing element 11 of elastic synthetic material mounted on the body 6 and surrounding the lock 8. The securing element 11 comprises an arm 12 terminating in a nosepiece 13 a shoulder 14 designed to interact with the end of the lock 8 and a slit enabling the arm 12 to undergo resilient displacement in respect of the body 6.

Figure 2:
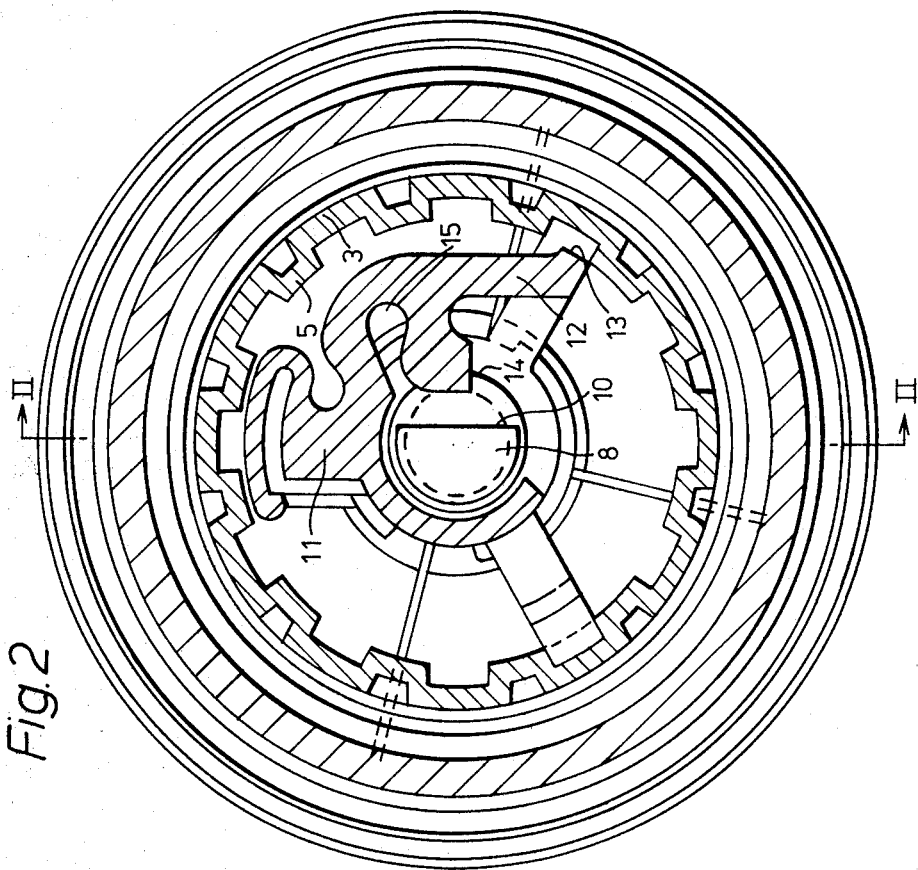
FIG. 2 is a section along the line II—II of FIG. 1, the plug not having been assembled.

In the idle position (FIGS. 1 and 2) the flatted bar 10 of the lock 8 is situated opposite to the shoulder 14 and the arm 12 has undergone no deformation. Its nosepiece 13 does not penetrate the teeth of the toothed rim 5, so that the rotary body 6 is not integral with the plate 3 and rotates freely in respect of this latter. This is the anti-theft position in which the plug cannot be screwed or unscrewed in relation to the base 1 when the rotary body is rotated.

Figure 3:
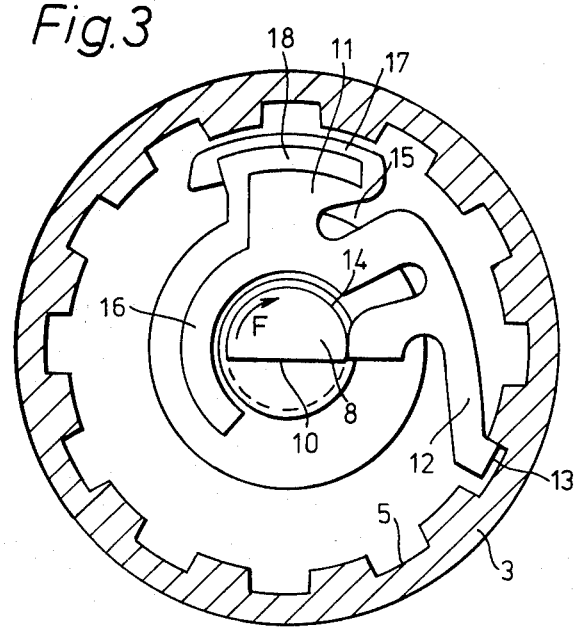
FIGS. 3 and 4 are simplified views analogous to those of FIG. 2 but referring to different positions.

When the lock 8 is rotated by a quarter turn in the direction shown by the arrow F, in order to move it into the position shown in FIG. 3, the full part of the end of the lock 8 repels the shoulder 14. The arm 12 moves away from the axis of the lock, owing to the presence of the slit 15. The nosepiece 13 comes to rest between two teeth of the toothed rim 5, in such a way that the body 6 is rotationally integral with the plate 3 and the plug can be screwed or unscrewed on the base 1, acting on the rotary body 6. This is the position for dismantling or assembling the plug.

Figure 4:
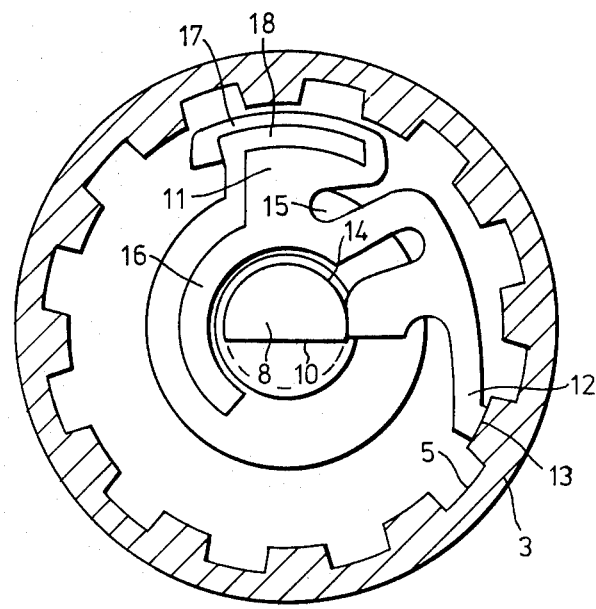

When at the end of the plug screwing operating the torque applied to the rotary body 6 exceeds a certain value, the arm 12 undergoes elastic deformation and the nosepiece 13 is disengaged from the toothed rim 5 (FIG. 4). The plug can no longer be completely screwed up.

Figure 5:
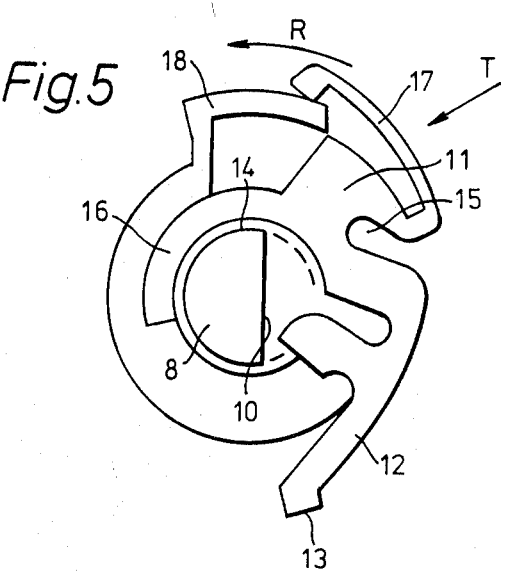
FIG. 5 is a schematic plan view illustrating the way in which the securing element is mounted on the plug.

In the version illustrated the securing element 11 enables the plug 8 to be secured in the rotary body 6. For this purpose the securing element 11 comprises a prolongation 16 of the shape of a circular arc, interacting with the groove 9' of the plug 8 and preventing the latter from performing any translatory movement. To enable it to be affixed to the rotary body 6 of the securing element 11 is also provided with a pawl 17 interacting with a shoulder 18 of the said rotary body 6. The securing element 11 is introduced by a translatory movement in accordance with the arrow T (FIG. 5), after which a rotation in accordance with the arrow R causes the pawl 17 to engage the shoulder 18. The circlip usually employed for securing the lock can thus be dispensed with.

I claim:

1. An anti-theft plug for a screw-threaded base comprising:
   (a) a plate with a thread corresponding to the threading of the base,
   (b) a body rotatable in respect of the said plate,
   (c) a cylindrical lock mounted in the said body,
   (d) a toothed rim on said plate and (e) a securing element being rotatable with the rotatable body and serving to render the said body integral with the said plate, having (f) an elastically deformable arm resiliently removable from the axis of the plug under the action of the said lock, while its free end, when the arm has undergone no deformation, it disengaged from said teeth, although it engages them when the arm has undergone deformation.

2. A plug according to claim 1 wherein the said arm and the remainder of the securing element are separated by a slit allowing for deformation.

3. A plug according to claim 2 wherein the said securing element is provided with a prolongation interacting with a groove of the lock.

4. A plug according to claim 3, wherein the said securing element comprises an elastic pawl interacting with a shoulder of the rotary body.

5. A plug according to claim 1 wherein the said securing element comprises a shoulder interacting with a flatted bar of the lock.

* * * * *